United States Patent [19]

Kaplinsky

[11] 4,429,384

[45] Jan. 31, 1984

[54] COMMUNICATION SYSTEM HAVING AN INFORMATION BUS AND CIRCUITS THEREFOR

[75] Inventor: Cecil H. Kaplinsky, Eindhoven, Netherlands

[73] Assignee: U.S. Philips Corporation, New York, N.Y.

[21] Appl. No.: 254,673

[22] Filed: Apr. 16, 1981

[30] Foreign Application Priority Data

Apr. 23, 1980 [NL] Netherlands .......................... 8002345

[51] Int. Cl.³ ............................................... H04J 6/00
[52] U.S. Cl. ........................................ 370/85; 370/92; 375/22; 375/36
[58] Field of Search .................... 370/9, 41, 43, 47, 85, 370/92, 93, 94; 375/7, 8, 36, 22, 113, 117; 332/9 R, 9 T, 11 R

[56] References Cited

U.S. PATENT DOCUMENTS

| | | | |
|---|---|---|---|
| 3,793,488 | 2/1974 | King | 370/85 |
| 4,071,706 | 1/1978 | Warren | 370/94 |
| 4,207,524 | 6/1980 | Purchase | 375/22 |
| 4,287,592 | 9/1981 | Paulish et al. | 370/94 |

*Primary Examiner*—Benedict V. Safourek
*Attorney, Agent, or Firm*—James J. Cannon, Jr.

[57] ABSTRACT

For a communication system for the transmission of digital information over a bus channel using pulses having a considerably different pulse length for the transmission of "0" and "1" bits, respectively. In the preferred embodiment the length of a "0" pulse is at least 2.1 times longer than the length of a "1" to pulse, so that the tolerance on detection of the reception has ample room to absorb wide tolerances in the frequency of a RC-clock generator, e.g. ±25%, for propagation time delays and for any inaccuracy in the moment of detection when pulse edges of low steepness must be used.

9 Claims, 4 Drawing Figures

COMMUNICATION SYSTEM HAVING AN INFORMATION BUS AND CIRCUITS THEREFOR

BACKGROUND OF THE INVENTION

1. Field of the Invention

The invention relates to a communication system of a type suitable for the transmission of digital information through a single channel information bus between two or more out of a number of, asynchronously operating, apparatus coupled to the information bus, each apparatus including at least a digital data processing portion having a clock generator for the generation of a periodic clock-signal, and the data processing portion being coupled by means of a digital control unit to the information bus in such manner that the transmission switches in the control units form an AND-gate circuit with the information bus. The invention also relates to a control unit for coupling an apparatus to the information bus.

2. Description of the Prior Art

Communication systems of the above type are usually used in situations where a plurality of apparatus share a transfer medium for intercommunication. This may be the communication between one or more intelligent terminals and a central computer in a laboratory, but the communication may also be for the control of domestic appliances, for example by means of a so-called "home-computer", audio and/or video equipment possibly being coupled to the information bus, both for the control of these appliances and for applying text data to a television receiver, these text data having been obtained by means of a teletext demodulator, or a viewdata terminal, etc.

Within computer systems the information bus may be a multi-channel bus through which digital information is transmitted in parallel.

When the average information density is sufficiently low, a single-channel bus will usually be sufficient, the information being transmitted serially. Low density applications are typically found in various interrelated consumer products such as home entertainment systems, home security systems and lower capability personal computer systems.

A communication system of the above type is known from the report on the "Second Symposium on Micro Architecture "Euromicro", 1976; pages 299–304, R. Sommer: "Cobus, a firmware controlled data transmission system".

This publication discloses a communication system in which the single-channel bus is in the form of a coaxial cable which, in combination with transmission switches connected thereto, forms an AND-gate circuit which is suitable for the transmission of information at a speed of approximately 200 kBaud, which means, minimum waiting periods, priority arbitration, addresses included, a net transmission capacity of approximately 10,000 information words, each consisting of 8 to 10 bits, per second.

As the bus circuit forms an AND-gate circuit, the bus will only be in the "ON" condition when all transmit switches keep the output in the "ON" position, which, in the case transistors are used as transmission switches, generally implies that the transmission switches do not carry current.

When a pulse is required, the transmission switch is rendered conductive by applying a current to its base, its output then going to the "OFF" state.

As soon as at least one transmission switch supplies an "OFF" pulse, the bus line is in the "OFF" state, irrespective of the positions of other transmission switches.

So-called "open collector" transmission switches are used which form a wired-AND function in combination with the coaxial cable.

The choice between "ON" or "OFF" is optional. In this article an AND-gate circuit is used in which the bus is in its "ON" state when all the coupled inputs are "ON". This definition will also be used in the further course of this description. It is well known that this definition is equivalent to an OR-gate circuit for "OFF" signals, the wired-OR function.

FIG. 2 of the cited SOMMER publication shows a simplified block-diagram of a microprocessor-controlled "Cobus interface", which, in the art, is usually indicated by the term "control-unit".

The Cobus-interface shown comprises inter alia a receiving circuit and an "interference detector". These circuits check whether another control unit simultaneously requests the bus line, by checking the transmitter's own address. A priority rule ensures that the apparatus having the lower address is given priority.

In addition, the control units include a "carrier detector", that is to say a circuit for reconstructing the bit clock and a synchronizing circuit. In the starting phases the bit rate is halved to reduce the effect of the synchronization problems due to inter alia the signal propagation time over the bus cable.

A carrier detector is usually formed by means of a so-called flywheel oscillator or a phase locked loop oscillator (PLLO).

This requires the use of a very stable clock generator, which can only be realized by the use of a crystal-controlled generator.

With a view to synchronization each word has a starting bit. Micro-synchronization as well as macro-synchronization occurs on the starting bit and on any other set bit, (R. Sommer, Cobus, a firmware controlled data transmission system, page 300, right-hand column, paragraph 5.2).

As a crystal-controlled clock generator is required at the transmitting end and a flywheel oscillator or a PLLO at the receiver end, the circuits are relatively expensive. They are suitable for the above-mentioned use in a laboratory but they are unacceptably expensive for use in simple systems. In the described system it is furthermore impossible to couple apparatus which operate with greatly different nominal speeds to one bus. Finally, the close time tolerances require well-defined and therefore steep pulse edges, so that a coaxial cable must be used as the bus line to render it possible to keep stray radiation to the environment at an acceptably low level.

A an inexpensive twisted two-wire system cannot be used in view of the requirements with respect to interference imposed by postal and similar authorities.

SUMMARY OF THE INVENTION

It is an object of the invention to provide an inexpensive communication system in which it is possible to use simple clock generators, for example a RC-network, to determine the frequency, an inexpensive two-wire bus and a means to connect a plurality of apparatus whose nominal communication speed can differ significantly, e.g. one order of magnitude.

According to the invention, a communication system of the type described in the preamble is characterized by a control unit having means for switching the transmission switch, when an apparatus transmits information bits over the information bus, for the transmission of a pulse signalling a zero information bit during a portion of an information bit-cell which is greater than half the information bit cell and equal to more than two full periods of the clock signal, and for the transmission of a pulse signalling a one information bit during a portion of the bit cell which is at least a factor of 2.1 shorter than the pulse duration of a pulse signalling a zero bit, the information bus being set to a logic "OFF" level by means of the switched transmission switch during a "0"- or a "1"-pulse.

As both a "0" and a "1" produce a pulse, the leading edge of a pulse may function as the starting point for a timing circuit, synchronization between the clock generators of transmitting and receiving apparatus being superfluous. After it has detected a pulse edge, the receiving apparatus determines after, for example, approximately ¾ of the bit cell whether the pulse had ended or not, that is to say whether it represents a "1" or a "0".

The large difference in length between a "1" and a "0"-pulse allows a reliable detection, in spite of large timing tolerances which are caused by:

(a) the use of RC-clock generators which in practice show a frequency tolerance of up to ±25%;

(b) the use of pulse edges having edge transition times from approximately 0.5 to 1.5 microseconds, small variations in a detection threshold already being capable of causing a timing inaccuracy of some tenths of microseconds, that is to say sometimes more than one full clock period in the case of a 4 MHz MOS-circuit; and (c) propagation delay effects over the bus line, to the same order of magnitude as the durations mentioned sub (b).

All bit cells in the system are expressed in microseconds. They are approximated by the control units in integer numbers of clock periods, these numbers depending on the nominal value of the clock frequency of the relevant apparatus, so that in general the actual pulse lengths and the detection moments at the receiving apparatus correspond only approximately to the defined periods of time.

A number of advantageous embodiments as characterized in the sub-claims will be described in detail by way of example in the description of the accompanying drawings.

DESCRIPTION OF THE PREFERRED EMBODIMENTS

Figure 1:
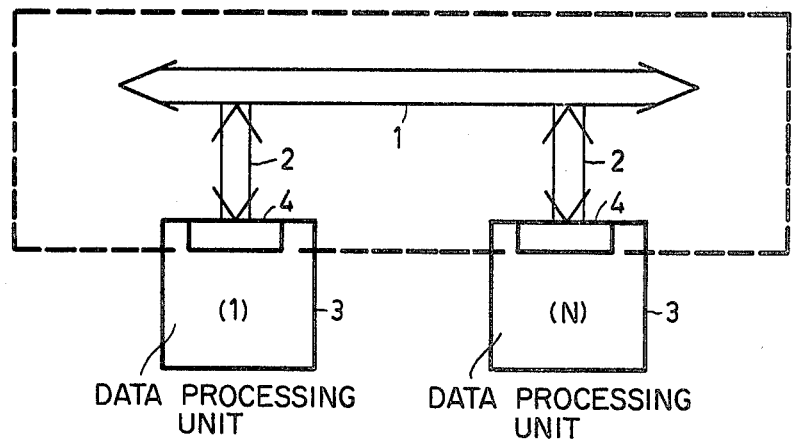
FIG. 1 is a simplified block-diagram of a communication system.

FIG. 1 shows a bus structure having an information bus 1 to which, at taps 2, a number of apparatus each having at least a data processing portion 3 including a control unit 4, are coupled.

The Figure shows only two of the apparatus 1 to N inclusive, denoted by UNIT(1) and UNIT(N), respectively.

The actual number is generally much larger, dozens or hundreds of these apparatus may be used. The embodiment described hereinafter is based on $2^{12}=4096$ addressable apparatus, but this is in no way a theoretical or other restriction.

Although, generally, not all apparatus must be capable of communication with all other apparatus, each apparatus will be occasionally in connection with one or more of the other coupled apparatus. Some apparatus will then act as "listeners" only, except for acknowledge signals, such as, for example, a washing machine. Other apparatus will occasionally act only as a "speaker", as, for example, a fire and/or burglary protection device. Other apparatus will sometimes act as "speaker", sometimes as "listener", such as, for example, a minicomputer, a viewdata terminal, etc.

In its most simple form the bus has one sole communication channel in the form of, for example, a light conductor, a coaxial cable or a pair of twisted wires ("twisted pair").

Such a busy system always requires an allocation regime. A "speaker" occupying the bus line must not be disturbed by other apparatus, as this would result in a mutilation of a transmitted message. Whether a line is busy can however be easily detected with known means by other apparatus.

The situation becomes more complicated when two "speakers" request use of the bus at the same time; at the same time being understood to mean simultaneously within, for example, some microseconds. Although, at first sight, this seems statistically highly improbable, it often happens in actual practice. It is possible that two or more apparatus want to use the bus at greatly different instants within the period in which the bus line is occupied by a third apparatus. As soon as the latter releases the bus, the apparatus which are standing-by detect this "simultaneously" and all try simultaneously to get the bus at their disposal.

Figure 2:
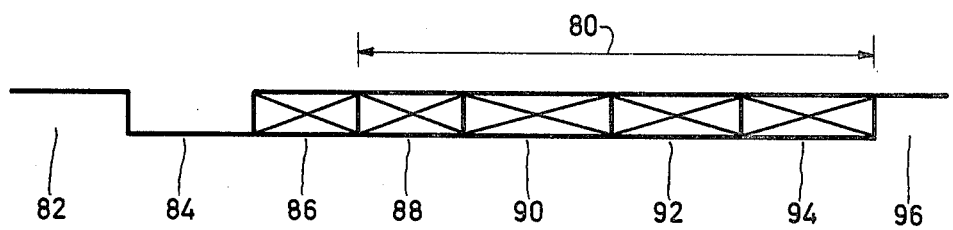
FIG. 2 shows a schematic survey of the composition of an information-package to be transmitted.

When an apparatus requires the bus it will start transmitting a message, the message being of the general form shown in FIG. 2.

During a test period 82 the control unit checks whether pulses are absent for a certain period of time and then supplies a starting bit 84. For other apparatus this starting bit has the character of a warning ("interrupt"), that a message may be forthcoming.

A mode field 86 is then transmitted. When the "master" knows in which mode the prospective "slave" can receive, the mode field corresponding with this mode will generally be transmitted. All lower-mode apparatus listening in stand-by must now release the bus during the whole period of time indicated as a "time slot" 80.

When the bus is not simultaneously requested by another apparatus an identification 88 (master address) is then transmitted and thereafter the address 90 of the prospective slave. At the end of the "slave bits" the master waits for one bit cell for an acknowledge signal indicating that the slave is ready to receive.

If this acknowledge signal does not come, this means that the relevant slave is not connected.

When the master does not know the mode of the slave then it starts in its own highest mode. The absence of the acknowledge signal may then imply that the slave can only receive in a lower mode. The master now restarts the message in a lower mode. Should, finally, no acknowledge signal be forthcoming even in the lowest mode, then the master must conclude that the slave is inaccessible, that is to say that it is not coupled to the bus or that it is switched-off.

Normally the acknowledge signal will come and the rest of the message will be sent. If necessary some check or control bits 92 then follow and, finally, the actual information transfer 94. At the end of the available time slot 80 the bus is released again 96.

When two or more apparatus require the bus, the arbitration becomes active at the transmission of the mode field.

The following description is based, by way of example, on a bus to which apparatus are coupled which have a number of widely different intrinsic speeds. The invention is in no way limited to this example; much more complicated situations and also simpler arrangements can function in a similar manner. When, for example, only one mode occurs the mode field may of course be omitted.

The following may serve as an example:

mode 0: clock frequency 0.55 MHz±25%; mode field 0 mode 1: clock frequency 2.2 MHz±25%; mode field 10 mode 2: clock frequency 4.43 MHz±0.1%; mode field 110.

The following Table I shows the approximate lengths of bit periods for data information or other bits, as well as the corresponding pulse durations.

apparatus having mode 2 will read, for example, 10 instead of 11(0) when a mode 1 apparatus has started simultaneously.

When two apparatus of the same mode try to occupy the bus, no distinction can be made on the basis of the mode field. Both apparatus recognize the mode field as good during the test and continue with the identification address, both still testing each bit simultaneously. In this case also the bus is immediately released when a deviation is detected. This means that in the case of equal modes the apparatus having the lowest address is given priority. If, for example, the address of apparatus A is 10100110 and the address of apparatus B is 10100011, then apparatus A will read a 0 instead of a 1 when checking the sixth bit, and it will release the bus. Apparatus B detects a correct bus behavior and continues its operation. A must immediately release the bus in order to prevent (in this example) that its eighth bit, a 0, would disturb the eighth bit of B, a 1.

The apparatus which reads its complete mode field and identification address on the bus in an undisturbed manner may now occupy the bus during the remaining part of the time slot 80.

It will be clear that as soon as one or more apparatus are in the arbitration period a third apparatus that tries to get the bus at a significantly later moment, will detect either pulses of mode field and identification addresses or of a subsequent message and must wait until the bus has been free of pulses for some time. The arbitration is only required in the case of simultaneous or approximately simultaneous requests.

In this example it was assumed that the 4.43 MHz apparatus have a crystal-controlled clock, for example on the basis of a standard crystal for the television PAL-frequency of approximately 8.86 MHz, while the slower apparatus operate with RC-controlled clock generators.

When a mode 2 apparatus transmits a mode 1 or a

TABLE I

| | Micro Seconds | | | | | | | |
|---|---|---|---|---|---|---|---|---|
| | Mode | | | | | | | |
| | 0 | | | 1 | | | 2 | |
| | Clock Freq. (MHz) | | | | | | | |
| | 0.55 | | | 2.2 | | | 4.43 | |
| | bit | 0-pulse | 1-pulse | bit | 0-pulse | 1-pulse | bit | 0-pulse | 1-pulse |
| Resting period | 600 | | | 600 | | | 0 | | |
| Start bit | 750 | | 250 | 750 | | 250 | 750 | | 250 |
| Mode bit(s) | 220 | 96 | | 110 | | 6 | 25 | | 3,5 |
| Master bits | 220 | 96 | 24 | 55 | 24 | 6 | 12,5 | 8,5 | 3,5 |
| Remaining bits | 110 | 64 | 16 | 27,5 | 16 | 4 | 8,32 | 6 | 2,5 |

In this example the time slot 80 has been given an average length of 7 milliseconds, with a maximum of approximately 10 milliseconds.

The mode fields have been chosen so that when two or more apparatus request the bus the lower mode apparatus, that is to say the slower apparatus, gets priority.

As the bus, being an AND-circuit is OFF-dominant and "0"-pulses are of a considerably longer duration than "1"-pulses, all tolerances included, the bus channel becomes also "0"-dominant.

As soon as an apparatus having, for example, mold field 10 starts in mode 1 and another apparatus having a mode field 0 simultaneously starts in mode 0, then the mode 1 apparatus will immediately detect when checking for the first 1 that, contrary to its expectation, a 0 is present on the bus and will immediately release the bus in favor of the lower mode apparatus. Likewise, an mode 0 message the control remains unchanged, but first the clock frequency is simply divided by 2 or 8.

For the mode 2 apparatus the difference in length between a "0"-pulse and a "1"-pulse is approximately a factor of 2.4 in this example: for the slower apparatus with the wider frequency tolerances a factor of approximately 4 has been chosen.

For a proper understanding of the operation the data included in Table I are sufficient.

In a practical implementation the various time periods, shown in Table II, have been chosen, by means of a computer program. The nominal times have been chosen so that at the nominal frequencies they always correspond to an integer number of clock periods for each apparatus.

Only the first part of Table II will be explained in detail.

When, for example, a mode 1 apparatus wants to start transmitting then a starting bit designated by the reference numeral 5 will be transmitted with a nominal length of 249.2 microseconds. After a certain propagation time and a portion of a clock period of another apparatus this starting bit can be received after approximately 10.8 microseconds.

Thereafter, after 177.0+55.5 microseconds, the 1 bit of the mode field is given at the moment designated by the reference numeral 6, with a pulse length of 4.1+1.8=5.9 microseconds. The listening apparatus receives this pulse with certainty within 4.1 microseconds if it can operate in mode 1 and determine approximately 9.9 microseconds after the beginning of the received pulse whether the pulse is a 0 or a 1. The transmitting apparatus performs this check also at approximately the same moment designated by the reference numeral 7. If this check gives the correct result, the mode-1 "0"-pulse is given thereafter with a pulse duration of approximately 22 microseconds.

By means of the bits indicated as "master-bits" the identification address of the master is sent thereafter but shall be interrupted immediately if the check indicates that another apparatus having a lower address must be given priority.

TABLE II

| | MASTER (Bit Periods) | Total bit period (μsec) | SLAVE |
|---|---|---|---|
| START BIT | 332.3 \| 10.8 \| 238.4 \| 177.0 | 758.5 | 139.1 |
| ARBITING | | | |
| Mode 0 bit | 25.3 \| 16.3 \| 7.2 \| 32.5 \| 32.5 \| 77.6 | 191.4 | 39.7 |
| Mode 1 bit | 55.5 \| 4.1 \| 1.8 \| 8.1 \| 8.1 \| 19.4 | 97.0 | 9.9 |
| Mode 2 bit | 12.0 \| 2.5 \| 0.9 \| 4 \| 0.9 \| 4.3 | 24.6 | 4.9 |
| Master bits | | | |
| Mode 0 | 54.2 \| 16.4 \| 7.2 \| 32.5 \| 32.5 \| 77.6 | 220.4 | 39.9 |
| Mode 1 | 13.5 \| 4.1 \| 1.8 \| 8.1 \| 8.1 \| 19.4 | 55.0 | 9.9 |
| Mode 2 | 0.9 \| 2.5 \| 0.9 \| 4.0 \| 0.9 \| 4.3 | 13.5 | 5.0 |
| Master parity bit | | | |
| Mode 0 | 54.2 \| 16.3 \| 52.4 \| 34.3 | 157.2 | 32.5 |
| Mode 1 | 13.5 \| 4.1 \| 13.1 \| 8.6 | 39.3 | 8.1 |
| Mode 2 | 0.9 \| 2.5 \| 3.2 \| 2.5 | 9.1 | 3.6 |
| Slave,control data | | | |
| Mode 0 | 0 \| 16.3 \| 52.4 \| 34.3 | 103.0 | 32.5 |
| Mode 1 | 0 \| 4.1 \| 13.1 \| 8.6 | 25.8 | 8.1 |
| Mode 2 | 0 \| 2.5 \| 3.2 \| 2.5 | 8.2 | 3.6 |
| Control D,1st data | | | |
| Mode 0 | 0 \| 16.3 \| 52.4 \| 34.3 | 103.0 | 32.5 |
| Mode 1 | 0 \| 4.1 \| 13.1 \| 8.6 | 25.8 | 8.1 |

TABLE II-continued

| | Bit Periods | | |
|---|---|---|---|
| | MASTER | Total bit period (μsec) | SLAVE |
| Mode 2 | 0 ⎿2.5⎾3.2⏋2.5 | 8.2 | ⎿3.6⎾ |
| Acknowledge | | | |
| Mode 0 | 0 ⎿16.3⎾19.9⏋34.3 | 117.5 | |
| Mode 1 | 0 ⎿4.1⎾5.0⏋20.3 | 29.4 | |
| Mode 2 | 0 ⎿2.5⎾2.7⏋3.8 | 9.0 | |
| Data | | | |
| Mode 0 | 0 ⎿16.3⎾19.9⏋81.3 | 117.5 | |
| Mode 1 | 0 ⎿4.1⎾5.0⏋20.3 | 29.4 | |
| Mode 2 | 0 ⎿2.5⎾2.7⏋3.8 | 9.0 | |

ALL TIMES ARE GIVEN IN MICROSECONDS.

Figure 3:
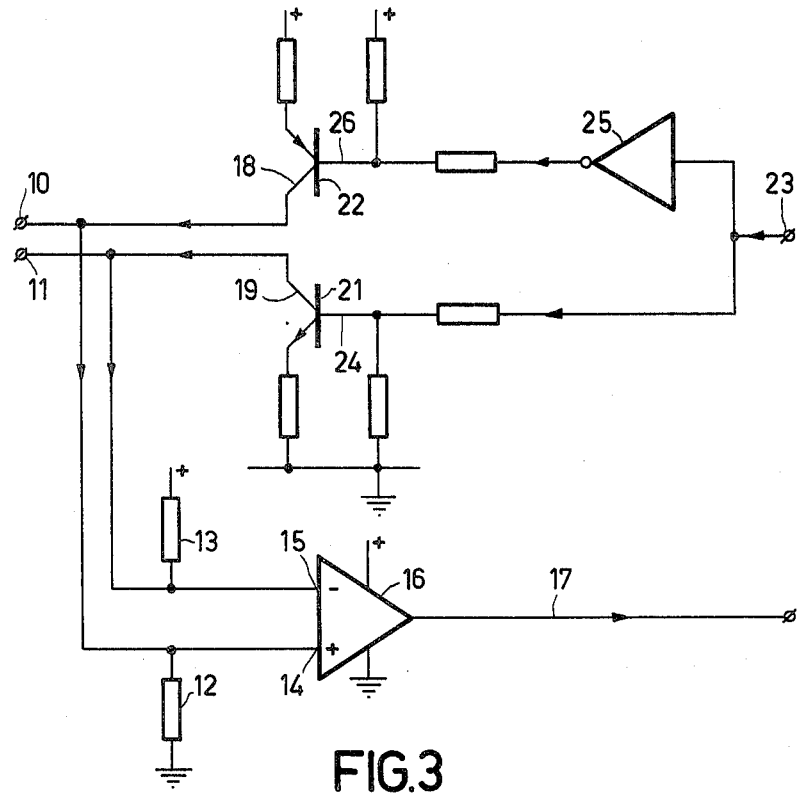
FIG. 3 is a circuit diagram of a portion of a control unit having transmission switches and a receiving portion.

FIG. 3 shows an example of a transmitting-receiving portion of a control unit suitable for exciting a symmetrical bus channel. At points 10 and 11 the unit is connected to the bus. The point 10 is coupled to ground by a resistor 12 and the point 11 is coupled to the supply voltage + by a resistor 13. The bus is also connected to the inputs 14 and 15, respectively, of a differential read amplifier 16 having an output 17.

So, if there are no pulses on the bus the input 15 has a higher voltage and the input 14 has a lower voltage; this is the situation defined as the ON-condition of the bus.

The bus is furthermore connected to outputs 18 and 19, respectively, of transmit switches 21 and 22, respectively, which do not carry current in the rest condition.

Positive digital signals which are generated by a gate circuit, not shown, are applied to an input 23 of the transmitting portion. This input is directly coupled to a control input 24 of the transmit switch 21 and to a control input 26 of the transmit switch 22 by an inverter 25.

As soon as a positive pulse appears at the input 23, the two transmit switches 21, 22 become conductive. In the example given here these switches are implemented by transistors for which the resistors 13 and 12, respectively, also form the collector resistors.

As soon as the transmit switches 21, 22 become conductive, the connecting point 10 rises to a higher voltage, while the connecting point 11 is set to a lower voltage. This is the OFF-condition for the bus.

Thus, the input polarity of the read amplifier 16 reverses its sign and an OFF-signal appears at the output 17.

The ON-condition of the bus can only exist when the outputs of all the transmit switches are in the ON-condition, that is to say the switches are non-conducting, so that the combination of transmit switches and bus indeed behave as an AND-circuit for ON-signals.

When the output 17 of the read amplifier 16 is at the OFF-level while no positive signal is applied to the input 23, this is only possible when the transmit switches in another control circuit are conducting: by means of this it is possible to check whether another apparatus transmits a message, or simultaneously requests the bus.

Figure 4:
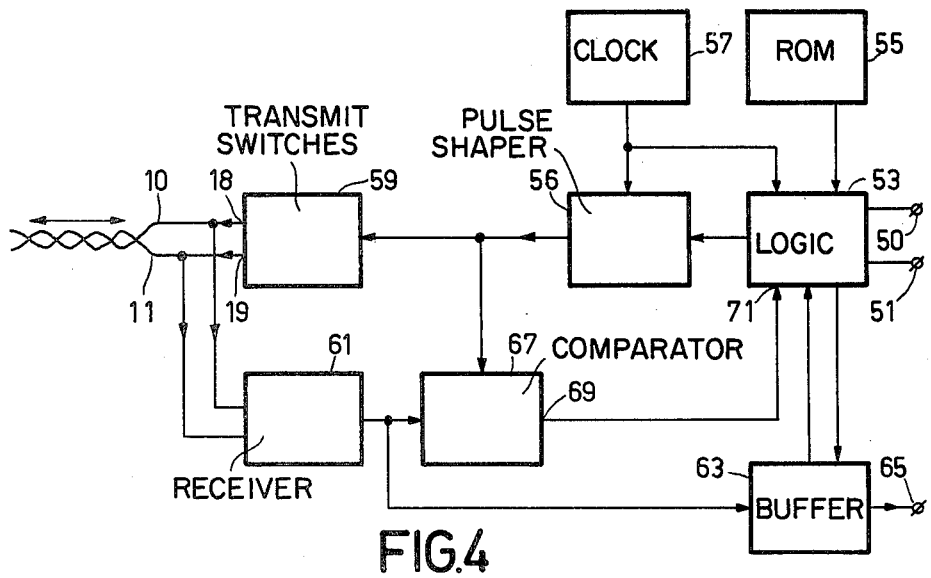
FIG. 4 is a simplified block-diagram of a control unit according to the invention.

FIG. 4 is a simplified block-diagram of a control unit according to the invention.

From the data-processing portion of an apparatus, information is applied to the control unit on the inputs 50, 51, usually in the form of data to be transmitted applied to terminal 50 and a destination address applied to terminal 51. This connection may, for example, be formed by a data bus and address bus, respectively, of a microprocessor.

The information is applied to a logic unit 53, which supervises and controls in a manner which is known per se the information to be transmitted or received. A number of fixed programming data, as well as, for example, an identification address are stored for this purpose in a read-only memory ROM, PROM or a comparable device 55, which is coupled to the logic unit.

The information to be transmitted is applied by logic unit 53 to a pulse-shaper 56, which is in the form of a logic gate circuit which ensures that the pulses are given the length as required in accordance with Table I or Table II. To this end the pulse-shaper is coupled to a clock generator 57, which is also the clock for the logic unit 53.

The pulse-shaper 56 applies the pulses with the correct length, counted as an integer number of clock periods, to the transmit switches 59, their outputs 18, 19 being connected to the bus 10 and 11, respectively. For corresponding elements the same reference numbers have been used as in the preceding Figure.

A signal present at the bus is applied to a receiver 61, which is coupled to an output buffer circuit 63, which has an output 65 for the transmission of information to the data-processing portion of the apparatus. For this control this output buffer 63 is also coupled to the logic unit 53.

The output signals of the pulse-shaper 56 as well as the output signals of the receiver 61 are furthermore applied to a comparator circuit 67 an output 69 of which is coupled to an input 71 for a stop signal of the logic unit 53. This comparator circuit 67 produces a stop signal as soon as the output signals of pulse-shaper 56 and receiver 61 differ from each other as a result of the fact that another apparatus occupies the bus or because another apparatus of a higher priority simultaneously requests the bus, as described in the foregoing.

The actual shape and contents of the various gate circuits, logic circuits, stores and buffer registers are not important for the inventive idea. By means of them functions are realized which are comparable to the functions which are also required for other circuits, such as, for example, the functions of the prior art described in the preamble of the present description. Any person having normal skill in the art can and will implement these functions as they may be required.

The essence of the invention resides in the choice of the ratio between the lengths of "0" and "1" pulse which ratio is greater than 2.1, for example 2.4; 4 or more, so that a reliable transmission of information can be warranted, in spite of considerable tolerances in the clock frequency of the clock generator 57, of time differences in the edge detection by the receiver 61 of edges having a low value of the steepness and of propagation time differences on the bus line.

If the switching time of the transmission switches is too short to comply with local radiation restrictions, the information bus can be terminated by connecting an impedance across the bus connectors, thereby loading any transmitting control unit with an extra load, which load may have a partially capacitive character.

Thereby it now appears to be possible to perform the transmission of information with the same speed and reliability as in the prior art, in spite of the fact that, particularly with a view to non-professional domestic uses, extremely inexpensive means have to be used, considerable savings being obtained by the use of an inexpensive twisted-pair bus line without shielding, simple RC-coupled clock generators and the omission of expensive synchronization means at the receiver end.

The following results were obtained in practice.

At the chosen length of the time slot 80, the slowest apparatus can transmit, in addition to the overhead consisting of the starting bit, mode field and addresses, one further information-byte of, for example, 9 or 12 bits. At first sight this may seem only little, but it is more than fast enough for processing information coming from a keyboard, either directly or by infrared or ultrasonic remote control. In general, not more than one character will then be supplied every 100 milliseconds (or much longer). This can be processed nominally in 7 up to a maximum of 10 milliseconds.

An apparatus in the mode-1 group can transmit approximately 16 bytes in one time slot in addition to the overhead, and a mode-2 apparatus approximately 71 bytes. In the latter case the transmission was limited for organizational reasons to $2^6$ bytes = 64 bytes per message.

At a clock frequency of 4.43 MHz, as used in this example, the bytes consisting of, for example, 8 information bits and one parity bit, can be transmitted at a speed corresponding to 8.5 microseconds per bit, that is approximately 120 kBaud.

For the chosen length of 64 bytes, this results in an average speed of approximately 10,000 bytes per second, including the overhead. For a longer time slot corresponding to 256 bytes, the overhead is practically negligible on a percentage base, so that a transmission speed of approximately 13,000 symbols per second is obtained which corresponds to 120 kBaud.

However, use of the invention is in no way limited to such speeds, the transmission speed for this example was chosen in view of the use of MOS-logic.

For edge delays of approximately 1 microsecond, a bit rate of e.g. approximation 500 kBaud can be obtained, and when steeper edges are used a correspondingly higher rate. In the latter case shielding of the bus is in general required with a view to the restrictions imposed on noise.

The required electronic circuits, the transmission switches included, may be incorporated in one single integrated circuit.

What is claimed is:

1. A communicaton system for the transmission of digital information through a single channel information bus between two or more out of a number of asynchronously operating apparatus coupled to the information bus, each apparatus including at least a digital data processing portion having a clock generator for the generation of a periodic clock signal, and a control unit, said data processing portion being coupled to the information bus by means of the control unit, said control unit having a transmission switch that can be switched by the control unit between an "OFF"-state and an "ON"-state to transmit digital signals to the information bus, an output of said transmission switch forming the output of the control unit being connected to the information bus, such that the two or more transmission switches of the two or more operating apparatus together with the information bus form an AND-circuit, which ANDs the signals transmitted to the information bus by these apparatus, the information bus being in the "ON" state only if all connected transmission switch outputs are in the "ON" state, and being in the "OFF" state if at least one of said outputs is in the "OFF" state, whereby the digital signals are represented as electrical pulses transmitted to the information bus by bringing the output of a transmission switch in the "OFF" state during at least a portion of an information bit period, which period has the length of an integral number of periods of the periodic clock signal, characterized in that:

when an apparatus transmits information over the information bus, its transmission switch is controlled such that for the transmission of a pulse signifying a zero information bit, the transmission switch is in the "OFF" state during a portion of the information bit period greater than half that period and equal to an integral number of periods of the periodic clock signal, and for the transmission of a pulse signifying a one information bit during a portion of the information bit period at least a factor of 2.1 shorter than the duration of a pulse signifying a zero information bit.

2. A communication system as claimed in claim 1, characterized by a control unit having means for first transmitting a bus request from an apparatus connected to said bus, when the data processing portion of an apparatus must start the transmission of information, this bus request being formed by a starting pulse having a length of at least 5 times an information bit period, and by at least one address bit having a length of at least 1.5 times an information bit period.

3. A communication system as claimed in claims 1 or 2, for the transmission of information between apparatus having data processing portions which have mutually different nominal information bit periods, characterized in that an apparatus having a shorter information bit period transmits pulses the lengths of which correspond to its own nominal information bit period or to the longer nominal information bit period of a slower, receiving apparatus.

4. A communication system as claimed in claim 3, characterized in that a transmitting apparatus transmits at the beginning of a transmitting period a mode field which is formed by at least one mode bit, the bit period of which is at least 1.5 times as long as an information bit period, the mode field indicating with which information bit period the transmitting apparatus thereafter transmits.

5. A communication system as claimed in claim 4, characterized in that the mold field is transmitted after the starting pulse and prior to the first address bit.

6. A communication system as claimed in claims 1 or 2, characterized in that the information bus is formed by a twisted pair of conductors and each control unit includes a first and a second transmission switch for supplying a symmetrical signal to the pair of connectors.

7. A communication system as claimed in claim 6, characterized in that a bus channel is terminated in such manner that the ascending and descending edges of transmitted pulses have transition times of at least 0.5 microsecond.

8. Apparatus, that for the execution of at least one function, includes:
   means for communicating with at least one other apparatus over an information bus channel using digital signals,
   a digital data processing portion having a digital address number,
   a clock generator for the generation of a periodic clock signal, and
   a control unit for coupling the data processing portion with a connector for the bus channel, said control unit having at least one transmission switch that can be switched by the control unit between an "OFF" state and an "ON" state to transmit digital signals to the bus channel, an output of said switch being connected to said connector, such that the transmission switches of at least two apparatus coupled to the bus channel form an AND circuit, which AND s the signals transmitted to the bus channel by these apparatus, the bus channel being in the "ON" state only if all connected transmission switch output are in the "ON" state, and being in the "OFF" state if at least one of said outputs is in the "OFF" state, whereby the digital signals are represented as electrical pulses transmitted to the bus channel by bringing the output of a transmission switch in the "OFF" state during at least a portion of an information bit period, which period has the length of an integral number of periods of the periodic clock signal, characterized in that:
   the control unit includes counting means for the generation of a number of electrical pulses representing a starting pulse, a mode symbol, an address number, control bits and/or information bits by counting clock pulses, such that for the transmission of a pulse signifying a zero information bit, the transmission switch is in the "OFF" state during a portion of the information bit period greater than half that period and equal to an integral number of clock periods, and for the transmission of a pulse signifying a one information bit during a portion of the information bit period at least a factor of 2.1 shorter than the duration of the pulse signifying a zero information bit.

9. Apparatus according to claim 8, characterized in that:
   the control unit further includes a receiver for the reception of signals on the bus channel connector, means for comparing the electrical pulses on the connector with the electrical signals which the apparatus is transmitting to the bus, and means for stopping the transmission if the comparing means show a difference between intended and obtained signal on the bus channel.

* * * * *